(12) United States Patent
Zanichelli et al.

(10) Patent No.: US 9,561,484 B2
(45) Date of Patent: Feb. 7, 2017

(54) METHOD FOR REVAMPING A SECONDARY REFORMER

(71) Applicant: Casale SA, Lugano (CH)

(72) Inventors: Luca Zanichelli, Milan (IT); Andrea Beretti, Rovellasca (IT)

(73) Assignee: Casale SA (CH)

( * ) Notice: Subject to any disclaimer, the term of this patent is extended or adjusted under 35 U.S.C. 154(b) by 186 days.

(21) Appl. No.: 14/391,912

(22) PCT Filed: May 7, 2013

(86) PCT No.: PCT/EP2013/059433
§ 371 (c)(1),
(2) Date: Oct. 10, 2014

(87) PCT Pub. No.: WO2013/167560
PCT Pub. Date: Nov. 14, 2013

(65) Prior Publication Data
US 2015/0107074 A1    Apr. 23, 2015

(30) Foreign Application Priority Data

May 9, 2012 (EP) .................................... 12167344

(51) Int. Cl.
*B01J 8/02* (2006.01)
*B23P 6/00* (2006.01)
*C01B 3/38* (2006.01)

(52) U.S. Cl.
CPC ............. *B01J 8/0285* (2013.01); *B01J 8/0242* (2013.01); *B01J 8/0257* (2013.01); *B01J 8/0278* (2013.01);
(Continued)

(58) Field of Classification Search
CPC . B01J 2219/00024; B01J 8/0242; B01J 8/025; B01J 8/0257; B01J 8/0278; B01J 8/0285; B01J 2208/00504; B23P 2700/03; B23P 6/00; Y10T 29/49345; Y10T 29/49352; Y10T 29/49716; C01B 2203/068; C01B 3/38–3/382; C01B 2203/0244; C01B 2203/0816–2203/0822; C01B 2203/1235–2203/1241; C01C 1/04; C01C 1/0417–1/0441

See application file for complete search history.

(56) References Cited

U.S. PATENT DOCUMENTS 4,650,651 A   3/1987 Fuderer
7,048,772 B1   5/2006 Bedetti
(Continued)

OTHER PUBLICATIONS

International Search Report issued in connection with PCT/EP2013/059433.

*Primary Examiner* — Christopher Besler
*Assistant Examiner* — Matthew P Travers
(74) *Attorney, Agent, or Firm* — Akerman LLP

(57) ABSTRACT

A method for revamping a secondary reformer (1), the reformer comprising an internal gas riser pipe (8) for routing a process gas from a bottom gas inlet to a combustion chamber (5) located above a catalytic zone (6), and a distributor (9) for introduction of an oxidation agent such as process air into the combustion chamber. The original distributor of the oxidation agent is discontinued, the gas riser pipe is shortened (8') and the outlet end of the shortened gas riser pipe is arranged to deliver a gas flow directed upwards. A new burner (20) is installed on top of the reformer, the new burner being arranged to deliver an oxidation agent such as process air with a downward flow, thus obtaining a counterflow mixing zone (23) and formation of a diffusion flame above the outlet end of the gas riser pipe.

10 Claims, 3 Drawing Sheets

(52) U.S. Cl.
CPC ............... *B23P 6/00* (2013.01); *C01B 3/382* (2013.01); *B01J 2208/00495* (2013.01); *B01J 2208/00504* (2013.01); *B01J 2208/00938* (2013.01); *B01J 2208/02* (2013.01); *B01J 2219/00024* (2013.01); *B01J 2219/185* (2013.01); *B01J 2219/1943* (2013.01); *C01B 2203/0244* (2013.01); *C01B 2203/068* (2013.01); *Y10T 29/49716* (2015.01)

(56) References Cited

U.S. PATENT DOCUMENTS

| | | | | |
|---|---|---|---|---|
| 2009/0136391 A1* | 5/2009 | Singh | ................... | B01J 8/0469 422/148 |
| 2011/0265379 A1* | 11/2011 | Bedetti | ................... | C01B 3/363 48/87 |

* cited by examiner

METHOD FOR REVAMPING A SECONDARY REFORMER

This application is a national phase of PCT/EP2013/059433, filed May 7, 2013, and claims priority to EP 12167344.6, filed May 9, 2012, the entire contents of both of which are hereby incorporated by reference.

FIELD OF APPLICATION

The invention relates to a method for revamping a secondary reformer, in particular but not limited to secondary reformers comprising a combustion chamber in the upper part, and an internal riser pipe which routes a gas feed from a bottom gas inlet to said combustion chamber.

PRIOR ART

Reforming is a well known technique for converting a hydrocarbon source into a useful product such as hydrogen or a make-up synthesis gas for a particular use, e.g. for the synthesis of ammonia. A well known layout of a reforming front-end, for example the front-end of an ammonia plant, includes a primary reformer and a secondary reformer.

For example, a steam flow and a suitable hydrocarbon source, such as natural gas, are reacted in a primary reformer. In some embodiments the primary reformer comprises a bundle of steam- or gas-heated tubes filled with a catalyst. The product gas leaving the primary reformer is further oxidized in the secondary reformer with the help of an air supply and in the presence of a catalyst. The reformed product gas leaving the secondary reformer is then treated in a number of downstream equipments which normally include at least one or more shift converters, a $CO_2$ washing column and a methanator. In ammonia plants the secondary reformer is operated with air or enriched air.

The secondary reformer can be an autothermal reformer (ATR) operated with pure oxygen.

A known embodiment of a secondary reformer includes a vertical vessel with a combustion chamber located substantially in the upper part, above a catalytic zone, and a bottom inlet for the process gas coming from the primary reformer. The reformer comprises an internal riser pipe arranged to direct the process gas from the bottom entry to said combustion chamber.

Usually the gas riser pipe ends with a gas distributor and/or gas deflector above the combustion chamber; the gas flow exiting the riser pipe is deflected substantially by 180° and traverses the secondary reformer from top to bottom, passing through the combustion chamber and then through the catalytic zone below.

Process air is introduced into said combustion chamber via suitable means which may include a plurality of nozzles or a suitable distributor. For example, in some known embodiments the process air is introduced through a distributor comprising a plurality of cylindrical sectors welded together and forming a ring structure around the gas riser. The lower surface of each sector has a plurality of nozzles for air injection, and a tile-like deflector is installed within the distributor. Usually the distributor comprises eight cylindrical sectors welded to each other so that, in a plane view, it appears like an octagon.

This kind of secondary reformer is appreciated for some advantages and is common, for example, in the ammonia plants. The layout with internal process gas riser pipe allows for both the gas inlet and gas outlet located at the bottom of the pressure vessel, which means a simple connection with other equipments. In particular, the bottom inlet helps keeping a short gas transfer line between the primary reformer and secondary reformer. Since the process equipments are vertical pressure vessels with a considerable height, it is advantageous to keep the process gas connections in the bottom part. The experience however has revealed also a number of drawbacks.

First, it has been noted that said reformers suffer a poor mixing between the reactants (air and process gas/syngas) inside the combustion chamber. This unsatisfactory mixing results in a non-uniform distribution of gas composition and temperature at the catalytic bed inlet, and possible formation of hot spots on the refractory lining. A non-uniform gas distribution causes an uneven utilization of the catalytic bed and increases the methane slip (unconverted methane leaving the secondary reformer with the product gas), which consequently increases the gas recirculation of the synthesis loop of an ammonia plant reducing the overall plant performance. Hot spots due to poor mixing are evidenced in some cases by erosion and glazing of alumina lumps, protecting the top layer of the catalytic bed, or by sintering and agglomeration of the catalyst grains. In cases of very poor mixing traces of hot spots could also be found on the combustion chamber refractory lining, typically with localized fusion of the lining, glazing or erosion of refractory bricks and mortar joints.

Another drawback is the so-called flame impingement. The process gas exiting the gas riser is deflected toward external walls of the vessel by the upper gas deflector. Thus, the process gas flows preferentially along the external walls of the vessel. It has been noted, however, that the process gas flow tends to deflect the air jets exiting from the air distributor toward the riser, resulting in a flame impingement on the refractory bricks which covers the process gas riser. A related effect is a non-uniform temperature field at the inlet of the catalytic bed, which can be another source of methane slip.

As a matter of fact, the experience shows that a high methane slip is typically measured at the outlet of this kind of secondary reformer.

Another problem is the uneven distribution of air between the air nozzles, especially with the above mentioned torus-shaped distributor. CFD simulations show that the differences between the maximum and the minimum mass flow rate in the air nozzles can reach 45% of the mean value. A strong uneven air distribution amplifies the poor distribution inside the combustion chamber and the non-uniform distribution of temperature and composition at the catalytic bed inlet.

A large number of secondary reformers with the above features are currently installed in the world. Hence, there is an incentive to provide an efficient revamping combining a better performance with a minimum change to the existing layout, in order to save costs. However, the prior art still lacks a solution to this problem.

SUMMARY OF THE INVENTION

The problem underlying the invention is to solve the above drawbacks and provide an efficient method for revamping the referred kind of secondary reformer.

The proposed solution involves the provision of a new burner which is installed on top of the reformer and replaces the air feeding means such as nozzles or distributor.

Hence the problem is solved with a method for revamping a secondary reformer comprising:

a vertical pressure vessel with a vertical axis, a bottom inlet for a process gas;
a combustion chamber and a catalytic zone, the catalytic zone being located below the combustion chamber;
an internal gas riser pipe connected to said bottom inlet of the process gas;
distribution means for introduction of an oxidation agent such as process air into said combustion chamber;
wherein said gas riser pipe has a gas outlet end which is above the combustion chamber and comprises means arranged to direct the process gas downwards, so that said process gas traverses the combustion chamber and then the catalytic zone flowing from top to bottom, and the method is characterized by comprising at least the following steps:

said original distribution means of the oxidation agent are discontinued,
the gas riser pipe is shortened so that the gas outlet end of the gas riser pipe is brought to a lower height in the pressure vessel and closer to the catalytic zone, compared to the original gas riser pipe, and the outlet end of the shortened gas riser pipe is arranged to deliver a gas flow directed upwards;
a new burner is installed on top of the reformer, said new burner being arranged to deliver an oxidation agent such as process air with a downward flow, in a mixing zone above the gas outlet end of the shortened gas riser pipe.

The shortening of the gas riser pipe can be carried out by removing a top portion of the existing gas riser pipe or by installing a new gas riser pipe shorter than the original pipe, according to different embodiments. Shortening the gas riser pipe provides room for the installation of the new burner and allows for a counter-flow mixing of the reagents, as explained below.

Said new burner delivers an oxidation agent which is air or enriched air or oxygen. In the most common cases, said agent is air. Normally a certain amount of safety steam is added to an oxidation agent.

According to one of the features of the invention, the riser pipe of the revamped reformer will deliver the process gas with a substantially upwards flow, contrary to the original design which tends to divert the gas flow by 180°. Accordingly, the original means for directing the process gas at the outlet of the riser pipe, which may include a gas distributor or a gas deflector for example, are preferably removed.

Once the revamping is completed, the downward-directed outlet of the newly-installed burner is above the upward-directed outlet of the gas riser pipe. The oxidation agent is then introduced with a counter-current flow relative to the process gas exiting the gas riser. In other words, the oxidation agent flows from top to bottom while the process gas flows from bottom to top.

Hence, the revamped secondary reformer has a mixing region substantially between the newly-installed burner and the gas riser pipe (and above the catalytic zone), where a counter-flow diffusion flame is formed by the process gas encountering the oxidation agent. The term of diffusion flame is well known to a person skilled in the art, and denotes a non-premixed flame where the oxidation agent (for example air) combines with the fuel (namely the process gas) by means of a diffusion process.

Preferably, the former means for introduction of the oxidation agent are physically removed since they will no longer be used. Related passages through the vessel, such as a main nozzle hole, are suitably plugged.

The newly-installed burner is made of a suitable material resistant to high temperatures such as, but not restricted to, a Ni/Cr/Fe alloy.

Preferably, said burner is provided with a swirl generator to provide a swirling motion of the oxidation agent and then to increase the mixing with the process gas, in the aforesaid zone of formation of a diffusion flame. For example the swirl generator may include helical fins or inclined fins arranged inside a generally tubular duct, in such a way to give a rotary motion to the oxidation agent.

The top cover of the reformer will need to be modified or replaced, in order to install the new burner. When feasible, it is preferable to keep the existing top cover, which will be modified to accommodate the new burner; if deemed necessary or appropriate, however, a new cover could be provided.

The existing air piping will also need some modifications in order to reroute the air flow—originally directed to air nozzles or the like in the combustion chamber—to the newly-installed top burner.

Clearly, a skilled person will determine any other modification of the existing reformer, according to the specific case, in order to carry out the inventive method.

Preferably, the invention is used to revamp the secondary reformer of the front end of an ammonia plant. This application however is not limitative.

The main advantage of the inventive revamping is the achievement of a better mixing between the process gas and the oxidation agent, which means a better uniformity of gas composition, velocity and temperature at the catalyst bed inlet, compared to the original design. This better uniformity implies the better utilization of the catalyst bed, a lower methane slip and a longer operating life of the catalyst.

Another advantage is a shorter flame, compared to the original design. The flame is always well detached from the refractory lining so to avoid dangerous hot spots. In fact, ignition is ensured by the high temperatures of the reactant streams and the resulting diffusion flame is well detached from the refractory lining of the pressure vessel and process gas riser. A related positive effect is no flame impingement against the top layer of the catalyst bed.

Another advantage of the invention is the minimal modification to the existing layout which means low investment costs and short pay-back time. In particular, the existing pressure vessel can be kept with few modifications and the existing main gas transfer lines to/from the secondary reformer are substantially unaltered. The method is then attractive for a large number of secondary reformers installed throughout the world.

The revamped reformer can also achieve a high flexibility in operation, typically from 40% to 110% of design load, and a longer operating life of all the equipments.

The features and advantages of the invention will be more evident with the help of the following detailed description.

DETAILED DESCRIPTION OF A PREFERRED EMBODIMENT

Figure 1:
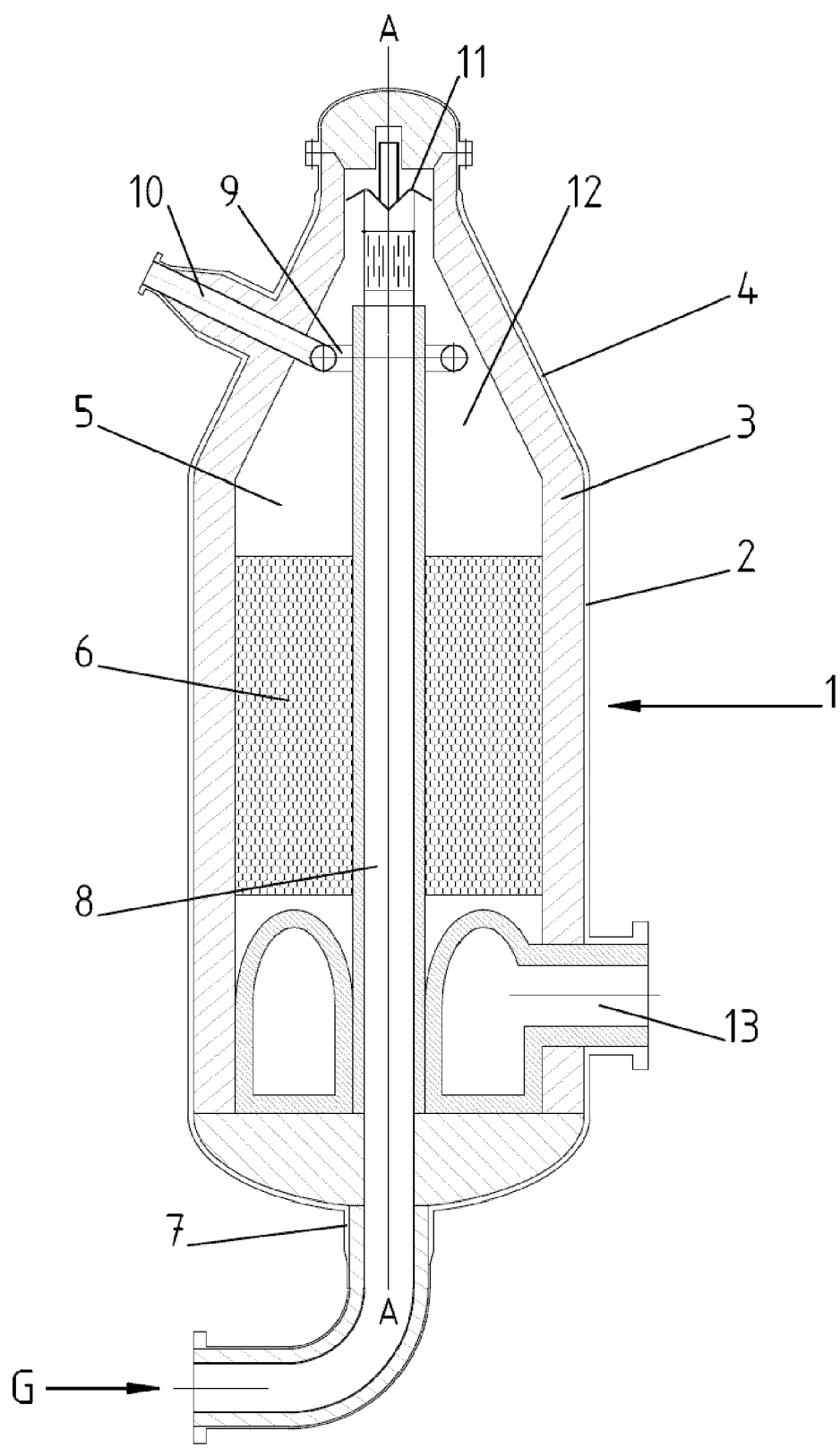
FIG. 1 is a scheme of reformer according to the prior art.

FIG. 1 shows a secondary reformer 1 which can be revamped according to the present invention. The reformer 1 has a vertical pressure vessel 2 with a refractory lining 3 and cone walls 4 in the upper part.

Basically, the reformer 1 comprises a combustion chamber 5, located in the upper part of the reformer, and a catalytic zone 6 located below the combustion chamber. The catalytic zone 6 comprises a suitable catalytic bed which can be supported e.g. by a ring-shaped arc in the lower part.

A process gas G coming from a primary reformer (not shown) enters the reformer 1 via a bottom inlet 7. The reformer 1 comprises an internal gas riser pipe 8 connected to said bottom inlet 7 and arranged to route the process gas G to the top combustion chamber 5. More in detail, the riser pipe 8 extends substantially all along the vessel 2, ending near the top of the reformer, as shown in the figure.

A flow of process air is introduced into combustion chamber 5 by means of an air distributor 9 which approximates the shape of a torus and surrounds the riser pipe 8 above the combustion chamber 5. The air distributor 9 is fed by an air duct 10 passing through a hole in the cone wall 4 and lining 3 of the reformer.

Reference is made here to process air but other oxidation agents could be used.

The reformer 1 also comprises a process gas deflector 11 placed above the upper termination of the riser pipe 8, and well above the combustion chamber 5. In some reformers, the riser pipe ends with a gas distributor. The process gas exiting the riser pipe 8 is then deflected by around 180° and is mixed with the process air emitted from nozzles of the torus-like distributor 9. The mixing takes place substantially in a zone 12 under the distributor 9 and above the combustion chamber 5; then the gas passes through the combustion chamber 5 and catalytic zone 6 flowing from top to bottom; the converted gas leaves the reformer 1 via a gas outlet 13 below the catalytic bed.

Figure 2:
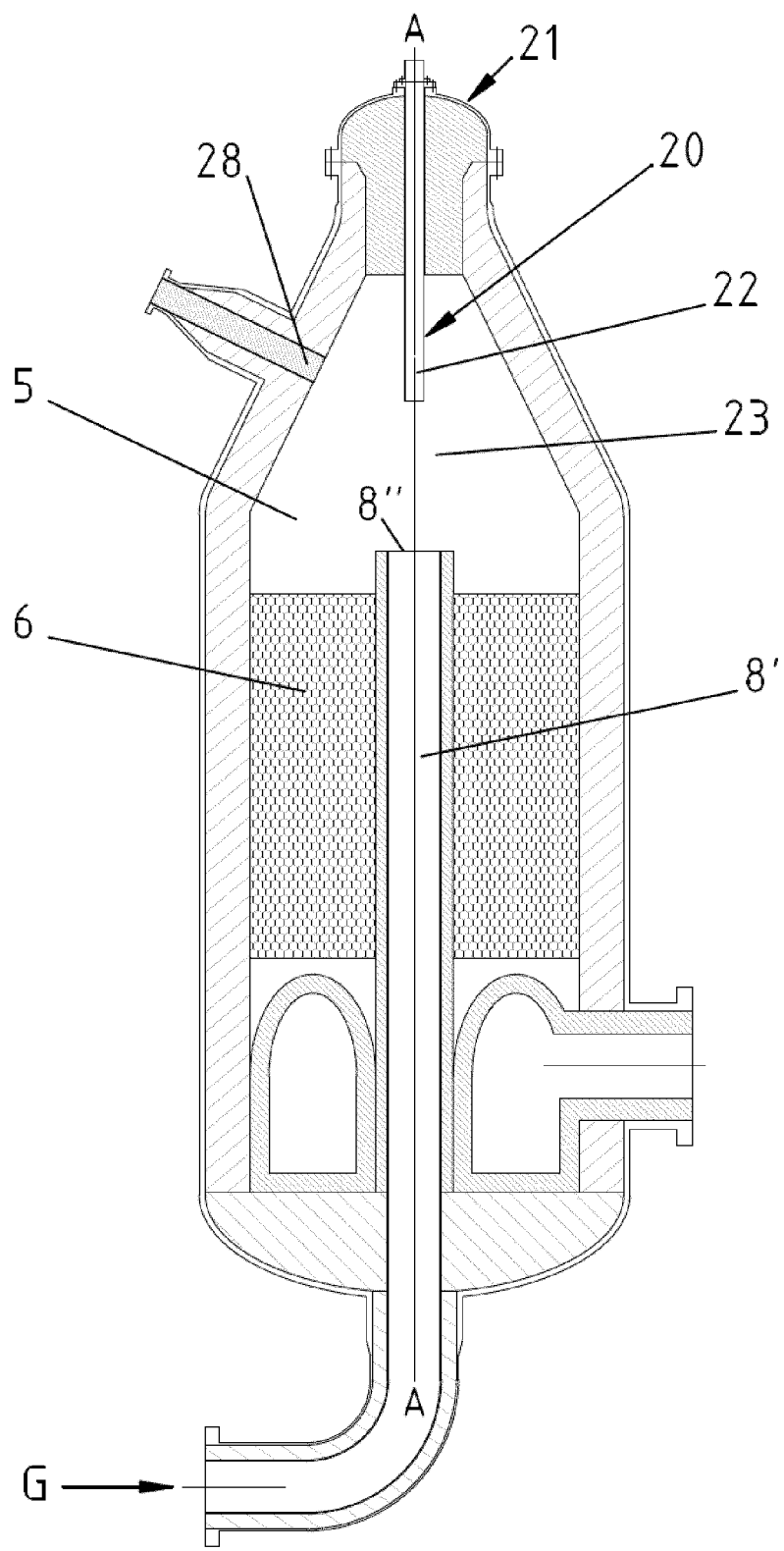
FIG. 2 is a scheme of the reformer of FIG. 1, after a revamping with installation of a new burner, according to one of the embodiments of the invention.

FIG. 2 shows the reformer 1 after revamping according to an embodiment of the invention. A new burner 20 is installed on top of the reformer 1 and a top portion of the original gas riser pipe 8 is removed, obtaining a shortened pipe 8'. Preferably the pipe 8 is shortened in such a way that the open end 8" of the modified pipe 8' is now slightly above the catalytic zone 6, instead of being at the top of vessel 2.

The gas deflector 11 is also removed. The modified pipe 8' now is configured so to generate a substantially axial flow of process gas directed from bottom to top, as apparent from FIG. 2.

The new burner 20 is mounted axially in a new or suitably modified top cover 21 of the reformer, and basically comprises a duct 22 arranged according to the axis A-A of the vessel 2. Said duct 22 is connected to the available process air line, originally feeding the air distributor 9, with the necessary modification of the piping or provision of new piping, according to the specific needs. The original air distributor 9 is removed from vessel 2 and related passage through the vessel 2 is closed with a suitable plug 28.

Figure 3:
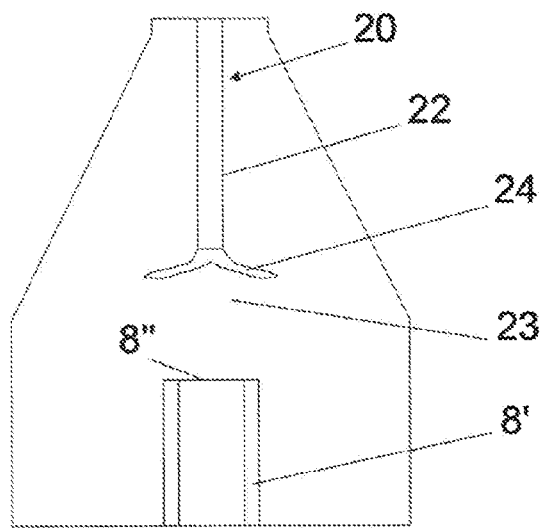
FIG. 3 is a detail of the reformer of FIG. 1, in operation, showing the diffusion flame formed at the outlet of the new burner.

It can be appreciated that the process air is now delivered by the burner 20 with a substantially downwards axial flow, namely a flow directed from top to bottom, in a mixing region 23 which is above the open end 8" of the shortened gas riser pipe 8'. In this region 23, the upward directed process gas exiting the gas riser pipe 8' encounters the downward directed process air from the burner 20. As shown in FIG. 3, a counter-flow diffusion flame 24 is formed in said mixing region 23 and thus in the combustion chamber 5, by the counter-current flows of process gas (fuel) and air.

Figure 4:
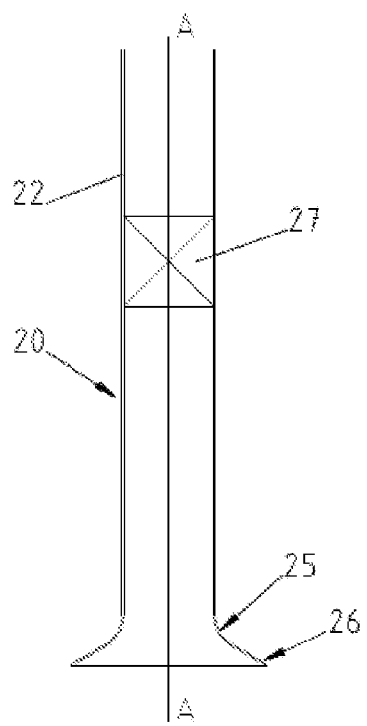
FIGS. 4 and 5 show different possible embodiments for the new burner.
Figure 5:
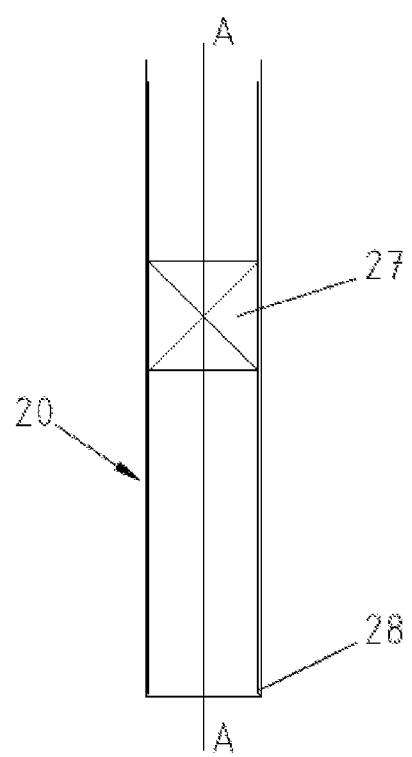

Said new burner 20 can be made in accordance with the burner described in EP 1531147. In particular, the burner 20 in a preferred embodiment comprises a frusto-conical end section 25 with a diverging open end 26, thus appearing with a distinctive trumpet-like shape (FIG. 4). Alternatively and depending on the specific plant operating conditions said new burner 20 comprises a sharp edge open 28 as apparent in FIG. 5. Swirling means 27 are also denoted in FIGS. 4 and 5.

The invention claimed is:

1. A method for revamping a secondary reformer wherein said reformer comprises:
   a vertical pressure vessel, a bottom inlet for a process gas;
   a combustion chamber and a catalytic zone, the catalytic zone being located below the combustion chamber;
   an internal gas riser pipe connected to said bottom inlet for a process gas;
   distribution means for introduction of an oxidation agent into said combustion chamber;
   wherein said gas riser pipe has a gas outlet end which is above the combustion chamber and comprises means arranged to direct the process gas downwards, so that said process gas traverses the combustion chamber and then the catalytic zone flowing from top to bottom, and the method comprises at least the following steps:
   discontinuing the original distribution means of the oxidation agent,
   shortening the gas riser pipe so that the gas outlet end of the gas riser pipe is brought to a lower height in the pressure vessel and closer to the catalytic zone, compared to the original gas riser pipe, and the outlet end of the shortened gas riser pipe is arranged to deliver a gas flow directed upwards; and
   installing a new burner on top of the reformer, said new burner being arranged to deliver an oxidation agent with a downward flow, in a mixing zone above the gas outlet end of the shortened gas riser pipe.

2. The method according to claim 1, wherein said new burner comprises a duct for the oxidation agent which is parallel to the axis of the vertical pressure vessel, thus delivering a substantially axial flow of said oxidation agent.

3. The method according to claim 1, wherein the gas riser pipe is shortened by removing a top portion of the existing gas riser pipe, or a new gas riser pipe shorter than the original pipe is installed.

4. The method according to claim 1, wherein an existing piping originally designed for feeding an oxidation agent to said distribution means is modified in order to redirect said oxidation agent to the newly-installed burner.

5. The method according to claim 1, wherein a top cover of the reformer is modified or replaced in order to allow the installation of the new burner.

6. The method according to claim 1, wherein said new burner is made of a Ni/Cr/Fe alloy.

7. The method according to claim 1, wherein said new burner comprises a swirl generator to provide a swirling motion of the oxidation agent.

8. The method according to claim 1, wherein said oxidation agent is air or enriched air or pure oxygen.

9. The method according to claim 1, wherein said secondary reformer is part of a front-end of an ammonia plant for the generation of a make-up synthesis gas for the synthesis of ammonia.

10. The method according to claim 1, wherein said secondary reformer is an autothermal reformer.

* * * * *